(12) United States Patent
Manka et al.

(10) Patent No.: US 7,728,058 B2
(45) Date of Patent: Jun. 1, 2010

(54) FIBER DISPERSANT-CONTAINING SYSTEMS

(75) Inventors: John S. Manka, Chardon, OH (US); John M. Lesniewski, Richfield, OH (US)

(73) Assignee: The Lubrizol Corporation, Wickliffe, OH (US)

(*) Notice: Subject to any disclaimer, the term of this patent is extended or adjusted under 35 U.S.C. 154(b) by 1088 days.

(21) Appl. No.: 10/533,409

(22) PCT Filed: Oct. 28, 2003

(86) PCT No.: PCT/US03/34851

§ 371 (c)(1), (2), (4) Date: Mar. 6, 2006

(87) PCT Pub. No.: WO2004/039851

PCT Pub. Date: May 13, 2004

(65) Prior Publication Data

US 2007/0072971 A1    Mar. 29, 2007

(51) Int. Cl.
*C08K 5/41* (2006.01)

(52) U.S. Cl. .................. 524/155; 524/356; 524/379

(58) Field of Classification Search ............. 524/155, 524/356, 379
See application file for complete search history.

(56) References Cited

U.S. PATENT DOCUMENTS

| | | | |
|---|---|---|---|
| 3,717,687 A | 2/1973 | Shanley et al. ............. 260/851 |
| 3,772,142 A | 11/1973 | Doggett et al. ............. 162/168 |
| 3,931,087 A | 1/1976 | Baatz et al. ........... 260/29.6 SQ |
| 4,430,158 A | 2/1984 | Jackey et al. ............... 162/156 |
| 4,772,425 A | 9/1988 | Chirash et al. .............. 252/547 |
| 4,948,464 A | 8/1990 | Richardson et al. ...... 162/157.1 |
| 5,039,549 A * | 8/1991 | Nguyen et al. ............. 427/513 |
| 5,079,076 A | 1/1992 | Lal ............................ 428/224 |
| 5,176,797 A | 1/1993 | Hartan et al. ............. 162/168.3 |
| 5,209,823 A | 5/1993 | Jansma et al. ............... 162/146 |
| 5,212,270 A | 5/1993 | Lal ............................ 526/287 |
| 5,237,014 A | 8/1993 | Barnabeo .................. 525/291 |
| 5,350,801 A | 9/1994 | Famili et al. ................ 525/59 |
| 5,376,148 A | 12/1994 | Schafflützel ................. 8/471 |
| 6,145,591 A * | 11/2000 | Boncan et al. ............. 166/291 |
| 6,291,552 B1 | 9/2001 | Dong ......................... 523/217 |
| 6,555,616 B1 | 4/2003 | Helbing et al. ............. 524/841 |

FOREIGN PATENT DOCUMENTS

| | | |
|---|---|---|
| EP | 0256312 | 2/1988 |
| EP | 1010733 | 6/2000 |
| GB | 1329565 | 9/1973 |
| GB | 2355419 | 2/1999 |
| JP | 1993294676 | 11/1993 |
| JP | 2000072492 | 3/2000 |
| JP | 2001354454 | 12/2001 |
| WO | WO 9960043 | 11/1999 |
| WO | WO 03056099 | 7/2003 |
| WO | WO 03056100 | 7/2003 |

OTHER PUBLICATIONS

Corresponding International Publication No. WO 2004/039851 and Search Report; International Publication Date: May 13, 2004.
JP Publication No. 55126551A published Sep. 30, 1980, Patent Abstracts of Japan (1980, JPO & Japio).
JP Publication No. 58161946A published Sep. 26, 1983, Patent Abstracts of Japan (1983, JPO & Jaipo).
JP Publication No. 01176247A published Jul. 12, 1989, Paetnt Abstracts of Japan (1989, JPO & Jaipo).

* cited by examiner

*Primary Examiner*—Robert D. Harlan
(74) *Attorney, Agent, or Firm*—Christopher D. Hilker; David M. Shold; Teresan W. Gilbert

(57) ABSTRACT

Dispersion additive system can be applied to fibers or particles, exhibiting improved dispersion, by including in the additive system a sulfonic-acid derived compound such as 2-acrylamido-2-methylpropanesulfonic acid or a salt thereof.

17 Claims, No Drawings

FIBER DISPERSANT-CONTAINING SYSTEMS

BACKGROUND OF THE INVENTION

The present invention relates to aqueous mixtures of additives that provide improved adhesion of adhesives to glass and improved dispersion of fibers and particles.

Various fibrous or particulate materials, including glass, glass microspheres, glass filament, glass powders and especially chopped fiberglass, are used in various products as a filler to reduce weight or add strength to products. Examples of these applications are the production of nonwoven mats, filter media, gaskets, roofing mats, roofing shingles, cementicious building materials, molded fiberglass parts, and automotive and marine body fillers.

Often fiberglass is used in an aqueous system, and during use these fibers can settle out of or float on top of liquid solutions, which leads to problems in production. Many fibers, including glass and especially fiberglass, are not normally wetted by water very well and have the tendency to clump together, or not disperse well, when added to an aqueous system. Surfactants are used to enable liquids to wet the fibers by lowering the surface tension, but the surfactants may not suspend or separate the individual fibers. Thickeners, for example, guar gum, are used to increase the viscosity of a water/fiberglass system to help suspend the fiberglass. Frequently, constant agitation and/or high shear is applied to keep the fiberglass homogenously suspended.

The production of a homogenous suspension of fiber in water will improve the handling and performance of fiber, allowing more uniform coverage and accurate placement of fiber in applications where fiber is used to give strength and fill to products. Reducing the need for continuous mixing or high shear is also beneficial from an energy and convenience standpoint.

The invention disclosed herein includes a dispersion additive system that promotes the wetting of glass, whether in fiber form, particulate form, or other form, e.g., plate glass, by liquids. When applied to fiber glass, it helps separate the fiber bundles into individual fibers without the need for high shear and suspends the separated individual fibers. The unbundling and dispersion of the fiber filaments by these additives leads to good infiltration of resins into the fiber as well as improved adhesion of the resin to the fiber. Good contact, infiltration, and adhesion of resins to glass promoted by these additives leads to a stronger bond between the resin and glass and increases the strength of the glass/resin system. When applied to glass in other forms, such as plate glass, the materials of the present invention promote adhesion of resinous coating materials to the glass.

The present invention, therefore, in one aspect, solves the problem of providing improved dispersion of fibers or particles, e.g., chopped fiber glass, which may otherwise need high shear or continuous stirring to disperse, separate and suspend them. It accomplishes this by chemically dispersing the glass fibers. The invention also modifies the surface of the glass, in whatever form, to improve wetting and adhesion.

SUMMARY OF THE INVENTION

The present invention provides a composition suitable for wetting, dispersing or suspending fiber or particles in aqueous solutions, namely,
composition comprising:
(a) an liquid carrier;
(b) fibers or particles dispersed or suspended therein; and
(c) a sulfonic dispersant with a molecular weight up to about 700 suitable for wetting, dispersing or suspending said fibers in said aqueous liquid carrier; provided that when (b) is particles, then the amount of (c) is up to about 5% by weight of the composition.

In another embodiment the invention provides a composition comprising:
(a) water;
(b) glass fibers; and
(c) 2-acrylamido-2-methylpropane sulfonic acid or a salt thereof.

In yet another embodiment the invention provides for a method for suspending or dispersing fibers or particles in an aqueous liquid carrier, comprising the steps of
(a) combining:
  (i) an aqueous liquid carrier
  (ii) fibers or particles; and
  (iii) a sulfonic dispersant with a molecular weight up to about 700 suitable for wetting, dispersing or suspending said fibers in said aqueous liquid carrier; provided that when (a)(ii) is particles, then the amount of (a)(iii) is up to about 5% by weight of the composition; and
(b) mixing the resulting composition.

The invention further provided for a method for preparing a non-woven mat of fibrous material, comprising the steps of:
(a) combining
  (i) an aqueous medium;
  (ii) fibers; and
  (iii) a sulfonic dispersant with a molecular weight up to about 700 suitable for wetting, dispersing or suspending said fibers in said aqueous medium;
(b) mixing the resulting composition;
(c) transferring said composition to a mat-forming device; and
(d) removing the aqueous medium from the composition.

As otherwise expressed, the present invention provides a composition suitable for wetting, dispersing or suspending fiber in aqueous solutions, comprising the following components: (a) an aqueous liquid carrier, optionally 100% water and optionally containing resins or co-solvents such as alcohols;
(b) glass, such as fiberglass, more preferably chopped fiberglass;
(c) an acid-based wetting/dispersing/suspension/adhesion aid, preferably a sulfonic acid based additive, more preferably a 2-acrylamido-2-methylpropane sulfonic acid based additive;
(d) optionally a buffer to keep the pH of the fiberglass-containing solution in a desired pH range, e.g., 2-6;
(e) optionally a water-based (i.e., water reducible, e.g. soluble or dispersible) resin used to bind the fiberglass together, which resin can be urea-formaldehyde, phenol formaldehyde or melamine formaldehyde, latex binders such as acrylic latex, styrene butadiene rubber latex, polyester acrylic latex, styrene acrylic latex, or poly vinyl acetate based or any combination thereof.

The invention thus also includes a method to contact fiberglass with additives, comprising the following steps:
(A) dissolving or combining an acid-based additive in water or into an aqueous liquid carrier system or resin system;
(B) adding the fiberglass to the additized water or resin;
(C) mixing the fiberglass solution; and optionally thereafter
(D) using the treated fiberglass or fiberglass resin system in a customer specific application.

Alternatively, the fiberglass can be treated with an aqueous solution of the acid based additive, isolated from the solution and then used in the customer specific application.

The invention encompasses the use of the components (a), (b) and (c) in slurries for preparing fiberglass matting, as well as composition comprising components (b) and (c) as such and as further used in applications hereinafter described.

DETAILED DESCRIPTION OF THE INVENTION

Various preferred features and embodiments will be described below by way of non-limiting illustration.

One component of the present invention (a) is a liquid carrier, preferably an aqueous liquid carrier, more preferably water, such as distilled, deionized, or tap water. The source of the water is not normally critical to the present invention. Additionally, the aqueous liquid carrier may comprise a co-solvent. Typical co-solvents include alcohols, acetone, dimethylformamide or combinations thereof. Alternatively, the liquid carrier can comprise solely the above co-solvents (i.e., without water).

The amount of component (a) in the compositions of the present invention is generally 99.9 or 99.5% to 50% by weight. Preferably the amount of component (a) is 95% to 99%. In another embodiment, the amount of component (a) is about 99%.

Another component of the present invention is (b) is fibers or particles. The fiber can be present as fiberglass, microglass, carbon fibers, coated carbon fibers, polyester fibers, polyimide fibers, polyamide fibers, acrylic fiber, cellulose fiber, polyethylene, polypropylene, rayon, nylon, asbestos and polyvinyl chloride and other various fibrous materials. The particles can be present as glass, glass microballons, alumina, basalt, silica, carbon black, titanium dioxide, or gypsum.

The amount of the fiber or particle component is generally 0.05% to 10% by weight of the composition. Preferably the amount of the fiber or particle component in the composition is 0.1% to 5% or to 1% by weight of the composition.

For the purpose of the present invention, fibers may be distinguished from particles in that they are much more elongated, typically having a length to diameter ratio of at least 1000 or at least 100. Particles are normally relatively less elongated, having a length to diameter ratio of e.g. 10 or less. Many particles may have a diameter of 100 micrometers or less (e.g. 50 or 10 micrometers).

Another component (c) is a sulfonic acid-derived compound. Specific examples of this type of component include 2-acrylamido-2-methylpropane sulfonic acid, salts thereof such as 2-acrylamido-2-methylpropane sulfonic acid sodium salt, 2-acrylamido-2-methylpropane sulfonic acid ammonium salt and amine salts, 2-acrylamido-2-methylpropanesulfonic acid fatty amine adducts or alcohol adducts, 2-acrylamido-2-methylpropane sulfonic acid oligomers, para toluene sulfonic acid, methane sulfonic acid, taurines, sulfohydroxamic acids, sulfo-N-hydroxy succinimides, vinyl sulfonic acid, methallyl sulfonic acid, styrenesulfonic acid, and other sulfonated monomers, such as sodium vinyl sulfonate, sodium allyl sulfonate, sodium styrene sulfonate, sodium methallylsulfonate, sodium sulfophenyl methallyl ether, sodium allyl ether sulfonate, and 2-sulfoethyl methacrylate, acrylic acid-(3-sulfopropyl) ester and salts (such as the potassium salt) methacrylic acid-(3-sulfopropyl) ester and salts, (such as the potassium salt), itaconic acid-bis-(1-propylsulfonic acid-3-) ester and salts (such as the di-potassium salt), 3-allyloxy-2-hydroxypropanesulfonic acid and salts (such as the sodium salt).

When the sulfonic acid derived compound is employed to impart improved adhesion to glass, it is a reactive sulfonic acid derived compound. This means that the compound has an additional reactive functionality in the molecule, besides the sulfonic acid or sulfonate moiety. The additional reactive portion permits chemical reaction or interaction of the molecule with other molecules of the same or similar species, or with molecules of a resinous coating material, or with the glass substrate. A preferred reactive moiety is an olefinic double bond. Without intending to be bound by any theory, it is believed that the olefinic double bond of such preferred materials as 2-acrylamido-2-methylpropanesulfonic acid is capable of various addition reactions (whether spontaneous or catalyzed by acid, base, or radicals) to increase the interaction of the molecules among themselves (e.g., by in-situ oligomerization) or with corresponding sites on a resinous coating material. Many of the examples of component (c) set forth above contain an olefinic double bond, as will be recognized by those skilled in the art, and as such are believed to be especially suited for the adhesion applications of the present invention.

Certain suitable sulfonic acids can also be described as an unsaturated-hydrocarbylamido-alkanesulfonic acid or a salt thereof. The "hydrocarbyl-amido" moiety comprises a hydrocarbyl group with an amide functionality thereupon, through which linkage is made to the remaining alkanesulfonic acid moiety. Such a material can have the general structure

As used herein, the term "hydrocarbyl" has a well-established meaning, namely, a group having a carbon atom directly attached to the remainder of the molecule and having predominantly hydrocarbon character. Examples of hydrocarbyl groups include hydrocarbon substituents, that is, aliphatic (e.g., alkyl or alkenyl) or alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The sulfonic acid derived compound will preferably have a molecular weight of less than 700, preferably less than 500 or 300.

The amount of component (c) in the compositions of the present invention (i.e., when used to promote dispersion of glass fibers or particles) can be present in an amount without a particular upper limit but preferably up to about 10%, 5%, 2%, or 1% by weight especially when component (b) is a particle. In some embodiments component (c) is generally 1 or 10 to 1000, or 10 to 500, or 25 to 400 or to 200 parts per million by weight of the composition. More preferably the amount of component (c) is 50 to 175 parts per million.

Optionally an additive can be included to modify the pH of the solution or liquid which contacts the glass. The composition's pH range can be 1-11. The additive can simply be an acid or base such as $H_2SO_4$, HCl, or NaOH. Examples of this type of component include mixtures of 2-acrylamido-2-methylpropane sulfonic acid and 2-acrylamido-2-methylpropane sulfonic acid sodium salt, mixtures of 2-acrylamido-2-methylpropane sulfonic acid and 2-acrylamido-2-methylpropane sulfonic acid ammonium salt, mixtures of 2-acrylamido-2-methylpropane sulfonic acid and sodium sulfate, and mixtures of methane sulfonic acid and sodium hydroxide, mixtures of p-toluene sulfonic acid and sodium hydroxide. This component can be a buffer system which can be made from an acid and its conjugate base, e.g., phosphate carboxylate, or carbonate buffers. Thus, the system can be buffered by the proper selection of component (d).

The amount of the pH adjusting component, if present in the compositions of the present invention, is generally 0.01 to 10% by weight of the composition. Preferably the amount is 0.1 to 5% by weight of the composition.

The composition described above can be prepared by adding the sulfonic acid derived compound to water and then contacting water with the fiber or particles, followed by shear and/or mixing, particularly if the fibers or particles are present as fiber glass to be dispersed in the aqueous medium. Alternatively, the fiber or particles and water can be first contacted, and then the sulfonic acid derived compound added.

One component which is optionally present is a resinous coating material suitable for coating on or adhesion to glass or other substrate. This material is sometimes referred to or used as a binder. Specific examples of this type of component include phenol formaldehyde resins, urea formaldehyde resins, melamine formaldehyde resins, polyvinyl acetate resins including polyvinyl acetate resin, latex binders such as acrylic latex, polyvinyl alcohol resins, styrene butadiene rubber latex, acrylic or methacrylic resins such as polyester acrylic latex or styrene acrylic latex, epoxy resins, and/or mixtures of the above. Preferably the resins are soluble or dispersible in water or in another solvent so that they can be applied to the surface of the glass or other material (particularly but not necessarily in fiber form) from solution or dispersion.

The amount of such a resin, if present in the liquid or aqueous compositions of the present invention, is generally 0.001% or 0.1% or 0.25% by weight up to 1% or 10% or 25% or even 50% by weight based on the amount of the liquid composition.

Other components which are conventionally employed in a fiber or particle system are typically also present, or may be omitted. Among such components are antifoam agents, thickening agents, surfactants, adhesive resins, biocides, curing catalysts, and radical inhibitors.

The above components can be in the form of a fully-formulated fiber system or in the form of a concentrate with a smaller amount of water. The relative weight ratio of sulfonic based additive to resin can be 0.1:99.9 to 50:50, or 0.5:99.5 to 10:90 or 1:99 to 5:95; in one embodiment it can be 2:98.

The steps in carrying out the method of the present invention can include the following:

(A) The sulfonic acid-derived compound is dissolved in water (or another liquid carrier system, e.g., an aqueous liquid carrier system) at an appropriate concentration (e.g. about 1% by weight). The temperature and mixing rate of the composition can be adjusted if necessary to completely dissolve the additive.

(B) A suitable amount of the fiber or particle material, especially if glass fiber (e.g., 0.5 g) is added to the water/suspension aid mixture (e.g., 49.5 g). The addition of the sulfonic acid-derived compound and the glass fiber, to the liquid medium, can occur in either order.

(C) The fiber or particle and liquid medium are preferably mixed until mixed well. The mixing can be high or low shear, by hand shaking, mechanical stirrer, sonicator, lightning mixer, tumbling, or drum roller.

(D) The resulting mixture, especially a fiber glass suspension, is used as per the specific application. This may involve transport, filtration, water removal, mat making, or combining with other components such as resins.

The utility of the invention includes but is not limited to applications involving the manufacturing of nonwoven mats, gaskets, roofing shingles, floor tiles, fiberglass insulation, and cementicious building materials. The following is a brief description of the use of the technology in the aforementioned products.

A use for this invention is in the production of non-woven mats. A typical process to make non-woven mats is to introduce the fibrous glass material into a vessel such as a mixing tank. An aqueous medium, typically tap water, is added to the vessel. The sulfonic acid product earlier described is also added to the vessel. Optionally, a thickener, a binder (e.g., a film-forming resin), a biocide, and a defoamer can also be added to the vessel. An acid or base additive is added to the vessel, if desired, to adjust pH of the composition. The resulting composition is stirred and transferred (e.g. pumped) to a mat-forming device such as a porous moving line or another device with a mesh or porous base onto which the composition is deposited as the aqueous medium is removed through the base (e.g. by vacuum). After the aqueous medium is pulled through the mesh, it can be recycled. The composition is then typically transported to a heater for further drying before being compressed and, typically, taken up on a roller to form a non-woven mat. Optionally, coatings may be applied to the mat prior to the drying step; that is, the mat may be treated as a glass article which can be further supplied with a resinous coating, as described above.

Another use for this invention is in the production of wet-laid gasket and filtration materials. The manufacture of wet laid fiberglass gasket and filtration media, for example, involves producing a slurry of chopped fiberglass suspended in a liquid, usually water, and then draining off the liquid phase of the slurry while it is in some sort of a form or mold. As the liquid is drained, the suspended fiberglass is uniformly deposited on the form or mold to yield a wet-laid fiberglass mat. The wet-laid fiberglass mat is then coated or bonded with resins, often polyurethanes, silicone, or thermoset resins like urea formaldehyde, melamine formaldehyde, phenol formaldehyde or polyvinyl acetate resin or mixtures thereof. The bonded fiberglass mat is then further processed to yield the finished gasket or filter media. The use of the present additives increases the uniformity of the fiberglass dispersion in the slurry. The better the fiberglass dispersion, the more uniform the wet laid mat, and thus the better the performance of the end product, since a uniform fiberglass mat is highly desirable. In addition, the present additives help suspend the fiberglass in the slurry, which reduces the amount of shear needed to process the slurry and also improves the handling properties of the fiberglass slurry. The present additives also increase the adhesion of the resins to the fiberglass, improving the gasket or filter product. Improved adhesion is also believed to arise from the improved inter-penetration of the resin into the fiberglass fibrils.

Another use for this invention is in the production of cementicious building materials, for example, fiberglass reinforced gypsum board. Some gypsum boards, such as fire resistant and thin core products, have fiberglass added to the formulation, typically at 1% or less weight of the board. The fiberglass adds strength without increasing combustibility. The manufacture of fiberglass reinforced gypsum board involves producing a slurry of chopped fiberglass suspended in a gypsum (calcium sulfate dihydrate)-water mixture. Other components of the gypsum mixture can be wax emulsions, other fillers such as vermiculite, and siloxanes. The fiberglass-containing gypsum mixture is then applied to sheets of craft paper, formed into the appropriate shape, and cured, by heating and driving off the water, to produce the final product. The present additives can be added directly to the gypsum-water mixture or to wax emulsions. Alternatively, the fiberglass can be pretreated with the present additives and then used in the production of fiberglass reinforced gypsum board. The fiberglass pretreatment can be affected by making a slurry of chopped fiberglass in water containing the dispersion additives. The additized water is then removed, leaving the treated fiberglass. The additized water can be reused to treat virgin chopped fiberglass. Alternatively, the fiberglass can be treated by being dipped or pulled through a bath containing water and the present additives. The treated fiberglass can then be utilized in the same way untreated fiberglass is used in this gypsum board application, optionally including reslurrying in water, as well as in other applications. The use of the present additives in this gypsum board application increases the dispersion and suspension of the fiberglass into the gypsum material. The better the fiberglass dispersion, generally the better the strength and performance of the end product, since a homogenous dispersion of fiberglass within the gypsum board is highly desirable.

This invention can also be used in fiberglass insulation material. The manufacture of fiberglass insulation batting involves coating spun fiberglass with an urea formaldehyde, melamine formaldehyde, phenol formaldehyde, acrylic thermoset, or polyvinyl acetate resin or mixtures thereof. The resin coating maintains the shape of the fiberglass insulation during manufacturing, shipping and final use. During manufacture, shipping and installation, the resin can chip and/or break free of the fiberglass, adversely affecting the performance of the insulation. The use of the present additives increases the adhesion of the resins to the fiberglass, improving the coated fiberglass product. Improved adhesion also arises from the improved inter-penetration of the resin into the fiberglass fibrils. In addition, using this invention may enable fiberglass insulation manufacturers to use less resin than is currently used, taking advantage of the increased adhesion to reduce material cost. During use for fiberglass insulation applications, the spun fiberglass can be dipped into or pulled through an additive containing water bath. The treated fiberglass can then be processed in the usual way. Alternatively, the additive can be added to the resin system used to bind the spun fiberglass. In this case, the adhesion additive is added to the resin system in proportions to deliver about 1% wt active additive in the final resin.

This invention also finds utility in the manufacture of roofing shingles and other roofing materials. During roofing shingle manufacture, a fiberglass mat is typically made from chopped, spun, or strand fiberglass. The mat can be made by taking an existing fiberglass mat and coating it with a urea formaldehyde, melamine formaldehyde, phenol formaldehyde, or polyvinyl acetate resin or mixtures thereof. Alternatively the fiberglass can be mixed with a urea formaldehyde, melamine formaldehyde, phenol formaldehyde or polyvinyl acetate resin or mixtures there of after which the resin/fiberglass mixture is cast as a mat ready for further use. The mat is then further processed to make the finished asphalt roofing shingles or rolled roofing material. The further processing can involve curing the fiberglass mat with heat, the addition of asphalt, aggregate and other additives to the mat which ultimately makes up the final product. The asphalt can be added with or without the use of any additional resin. The fiberglass mat is used to add strength to the product. The inclusion of the invented compound increases the strength of the resultant fiberglass mat, which thus improves the final product. The increase in strength is believed to result from the enhanced adhesion of the resins to the fiberglass and from the improved inter-penetration of the resins into unbundled fiberglass fibrils.

In the manufacture of fiberglass containing roofing materials, the fiberglass can be dipped into or pulled through an additive-containing water bath. The treated fiberglass can then be processed in the usual way. Alternatively, the additive can be added to the resin system used to bind the roofing material product. The adhesion additive is added to the resin system in proportions to deliver 1% wt active additive in the final resin. The treated mat is then further processed to make the finished asphalt roofing shingles or rolled roofing material.

Further information on fiberglass mats, the method of their manufacture, and their uses, is found in U.S. Pat. No. 6,084,021

EXAMPLES 1-11

Suspension of Fiber Glass

Example 1

Five grams of 2-acrylamido-2-methylpropanesulfonic acid and 44.5 grams of tap water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The fiberglass is immediately dispersed and suspended.

Example 2

The procedure referenced in Example 1 is repeated except using distilled water in place of tap water. The fiberglass is immediately dispersed and suspended.

Example 3

Five grams of para-toluene sulfonic acid and 44.5 grams of deionized water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The fiberglass is dispersed and suspended over 5 minutes (that is, the individual fibrils within the fiberglass bundles become separated and dispersed, although not immediately, yet within 5 minutes).

Example 4

Five grams of 98% active concentrated sulfuric acid and 44.5 grams of tap water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The fiberglass is immediately dispersed and suspended but then settles after standing for 8 hours.

Example 5

Five grams of 2-acrylamido-2-methylpropane sulfonic acid sodium salt and 44.5 grams of tap water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The fiberglass is completely dispersed and suspended over a 24 hour time period.

Example 6

Five grams of 2-acrylamido-2-methylpropane sulfonic acid ammonium salt and 44.5 grams of tap water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The fiberglass is completely dispersed and suspended over a 24 hour time period.

Example 7

Five grams of 2-acrylamido-2-methylpropane sulfonic acid and 44.5 grams of tap water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The aqueous solution is then decanted from the treated fiberglass. To the decanted aqueous solution is added 0.5 grams of virgin chopped fiberglass. The chopped fiberglass and the decanted aqueous solution are shaken by hand for 1 minute. The fiberglass is immediately dispersed and suspended.

Example 8

Seven grams of a 70% active aqueous solution of methane sulfonic acid and 44.5 grams of tap water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The fiberglass is dispersed and suspended over 5 hours and begins to settle after 3 days.

Example 9

One gram of 2-acrylamido-2-methylpropane sulfonic acid and 48.5 grams of tap water are added to a 60 mL (2 ounce) screw capped glass jar. The solution is mixed by hand to form a clear colorless solution. To this solution, 0.5 grams of chopped fiberglass are added. The chopped fiberglass and aqueous solution are shaken by hand for 1 minute. The fiberglass is immediately dispersed and suspended.

Example 10

Two and a half grams of 2-acrylamido-2-methylpropane sulfonic acid, 2.5 grams of 2-acrylamido-2-methylpropane sulfonic acid sodium salt, and 44.5 grams of tap water are added to a 60 mL (2 ounce) screw capped glass jar. The resultant buffered solution is mixed by hand to form a clear colorless solution. To this solution, 0.5 grams of chopped fiberglass is added. The chopped fiberglass and aqueous solution are shaken by hand for 1 minute. The fiberglass is immediately dispersed and suspended.

Example 11

Five grams of 2-acrylamido-2-methylpropane sulfonic acid homopolymer and 48.5 grams of tap water are added to a 60 mL (2 ounce) screw capped glass jar. The solution is mixed by hand to form a clear colorless solution. To this solution, 0.5 grams of chopped fiberglass is added. The chopped fiberglass and aqueous solution are shaken by hand for 1 minute. The fiberglass is immediately suspended.

Fiberglass dispersion—The fiberglass dispersion/suspension tests are run by adding 1% fiberglass to an aqueous solution containing the suspension aid. Initially the wetting characteristics are noted, for example, whether the glass sits atop the water or wets rapidly (initial wetting is desired). Next the glass and water sample is shaken by hand for 1 minute and let settle. This test assesses whether the glass is separated into individual fiber and whether or not the fibers are suspended. Both properties are visually apparent.

The test results show that acidic additives give good dispersion and suspension. Of the acidic additives, sulfonic acid derivatives give better performance. Of sulfonic acid derivatives, 2-acrylamido-2-methylpropane sulfonic acid derivatives give better performance. Of the 2-acrylamido-2-methylpropane sulfonic acid derivatives, 2-acrylamido-2-methylpropane sulfonic acid gives the best result in fiberglass dispersion and suspension.

EXAMPLES 12-14

Adhesive Systems

Example 12

One gram of 2-acrylamido-2-methylpropane sulfonic acid is added to 9 grams of a fully formulated polyvinyl acetate resin emulsion product (CustomBond MPA-11™, manufactured by CP Adhesives) with mixing. To the treated resin is added 40 grams of chopped fiberglass. The resultant resin/fiberglass mixture is a system with good glass adhesion properties.

Example 13

One gram of 2-acrylamido-2-methylpropanesulfonic acid sodium salt is added to 99 grams of a fully formulated polyvinyl acetate resin emulsion product (Titebond™, manufactured by Franklin International) with mixing. The resultant mixture is an adhesive with good glass adhesion properties.

Example 14

One gram of 2-acrylamido-2-methylpropanesulfonic acid sodium salt is added to 99 grams of a urea formaldehyde resin emulsion product (manufactured by Dynea) with mixing. The resultant mixture is an adhesive with good glass adhesion properties.

Testing of several of the compositions described above is carried out by the following test procedures:

EXAMPLES 15-22

Adhesion

Adhesion Promotion—The adhesion performance of a film of polyvinyl acetate resin or urea formaldehyde resin to glass is assessed by ASTM D-3359 procedures A and B. The procedures involved coating of a thin layer of aqueous solution of polymer onto a glass plate, followed by drying of the polymer to provide a film. A rating of 5 is the highest possible adhesion result and 0 is the worst possible result. The results show that the addition of 1% by weight of 2-acrylamido-2-methylpropanesulfonic acid and derivatives to the aqueous solution of polymer leads to improved adhesion of resin to the glass panel.

| Ex. | Product | Adhesion (ASTM D3359B) |
|---|---|---|
| 15 | Polyvinyl Acetate Resin (PVA) baseline (comparative ex.) | 1B |
| 16 | 1 wt % 2-acrylamido-2-methylpropane-sulfonic acid/99 wt % PVA | 4B |
| 17 | 1 wt % 2-acrylamido-2-methylpropane-sulfonic acid, Na salt/99 wt. % PVA | 5B |
| 18 | 1 wt % 2-acrylamido-2-methylpropane-sulfonic acid, ammonium salt/99 wt. % PVA | 5B |
| 19 | Urea Formaldehyde (UF) Resin base line (comparative) | 3B |
| 20 | 1% wt 2-acrylamido-2-methylpropane sulfonic acid/99% wt UF Resin | 4B |
| 21 | 1% wt 2-acrylamido-2-methylpropane sulfonic acid Na salt/99% wt UF Resin | 4B |
| 22 | 1% wt 2-acrylamido-2-methylpropane sulfonic acid Ammonium Salt/99% wt UF Resin | 3B |

EXAMPLES 23-30

Resin-Film Hardness

Resin Film Hardness—The film hardness of a film of polyvinyl acetate resin or urea formaldehyde is assessed by ASTM D-3363 Test. The hardness scale used in this test is as follows from softest to hardest coating: 6B, 5B, 4B, 3B, 2B, B, HB, F, H, 2H, 3H, 4H, 5H, 6H, 7H, 8H, 9H The results show that the addition of 0.25 to 1% by weight 2-acrylamido-2-methylpropane sulfonic acid derivatives to the aqueous solution of polymer leads to improved hardness of the resin adhered on the glass panel.

| Ex. | Product | Hardness (ASTM D3363) |
|---|---|---|
| 23 | Polyvinyl Acetate Resin (PVA) baseline (comparative ex.) | 1H |
| 24 | 0.5 wt % 2-acrylamido-2-methylpropane-sulfonic acid/99.5 wt % PVA | 5H |
| 25 | 1 wt % 2-acrylamido-2-methylpropane-sulfonic acid, Na salt/99 wt. % PVA | 5H |
| 26 | 0.25 wt % 2-acrylamido-2-methylpropane-sulfonic acid, ammonium salt/99.75 wt. % PVA | 5H |
| 27 | Urea Formaldehyde (UF) Resin base line (comparative) | 3H |
| 28 | 1% wt 2-acrylamido-2-methylpropane sulfonic acid/99% wt UF Resin | 9H |
| 29 | 1% wt 2-acrylamido-2-methylpropane sulfonic acid Na salt/ 99% wt UF Resin | 9H |
| 30 | 1% wt 2-acrylamido-2-methylpropane sulfonic acid Ammonium Salt/99% wt UF Resin | 8H |

EXAMPLES 31-37

Fiber Suspension Mat Formation and Strength

Example 31

To 1700 liters of tap water is added, in no particular order, 150 mL Foam Blaster™381 (a commercially available antifoam agent), 250 mL of a 50% by weight aqueous solution of a 2-acrylamido-2-methylopropane sulfonic acid sodium salt adjusted to pH 7, 0.18 kg of a commercial polyvinyl alcohol binder, and 500 mL of a commercial viscosity modifier. The above mixture is mixed using a circulation pump or paddle mixer to ensure homogeneity. The pH of this resultant solution is 7. To the above mixture is added 1.63 kg of 1.27 cm length "M" glass fibers from PPG. The resultant solution/fiberglass mixture exhibits good fiber dispersion properties.

Example 32

Example 31 is repeated using similar glass fibers from Johns Manville. The resultant solution/fiberglass mixture exhibits good dispersion properties.

Example 33

Example 31 is repeated except that 75 mL of the 50% by weight aqueous solution of a 2-acrylamido-2-methylpropane sulfonic acid sodium salt is used, along with 1.63 kg of 0.635 cm length "DE" fiberglass from Owens Corning. The resultant solution/fiberglass mixture exhibits good fiber dispersion properties.

Example 34

Example 33 is repeated using 0.41 kg of 0.635 cm length "DE" fiberglass from Owens Corning and 1.22 kg of a "microglass" from Lauscha.

Example 35

Example 31 is repeated except that the mixture is adjusted with sodium hydroxide to a solution pH of 10, prior to addition of the 1.63 kg of 1.27 cm length "M" glass from PPG. The resultant solution/fiberglass mixture exhibits good fiber dispersion properties.

Example 36

Example 35 is repeated using 1.63 kilograms of 1.27 cm length "M" glass from Johns Manville. The resultant solution/fiberglass mixture exhibits good fiber dispersion properties.

Example 37

Example 33 is repeated, but adjusting the pH to a value of 2 by adding 38 weight % aqueous hydrochloric acid prior to adding 0.41 kg of a 0.635 cm length "DE" fiberglass from Owens Corning and 1.22 kg of "microglass" from Lauscha.

The resultant solution/fiberglass mixture exhibits good fiber dispersion properties.

Certain of the materials from Examples 31-37 are used to prepare wet-laid mats of fiberglass. The mats are prepared on commercial equipment, by pumping the dispersed fiberglass to a mat-forming line, where the fibers deposit onto a moving wire base as the water (containing a major portion of the polyvinyl alcohol binder and other additives) is pulled through the mesh by vacuum. The mat is then transported to a heater for drying before being taken up on a roller.

Table of Test Results[a]

| Ex. | Thickness, mm (mils) | Density g/cm³ | Tensile Strength N/m (Lbs/in) MD | Tensile Strength N/m (Lbs/in) TD | Tear Strength grams MD | Tear Strength grams TD | Mullen Burst strength kPa (Psi) |
|---|---|---|---|---|---|---|---|
| 31 | 0.190 (7.5) | 0.261 | 523 (3.10) | 378 (2.16) | 82 | 68 | 120 (18) |
| 32[b] | | | | | | | |
| 33 | 0.305 (12.0) | 0.164 | 890 (5.08) | 853 (4.87) | 51 | 43 | 100 (15) |
| 34[c] | | | | | | | |
| 35 | 0.251 (9.9) | 0.198 | 851 (4.86) | 774 (4.42) | 98 | 95 | 100 (15) |
| 36 | 0.188 (7.4) | 0.264 | 583 (3.33) | 529 (3.02) | 62 | 53 | 83 (12) |
| 37 | 0.297 (11.7) | 0.169 | 399 (2.28) | 538 (3.07) | 22 | 22 | 69 (10) |

Notes:
[a] All strength results normalized to a mat of 50 g/m². MD = machine direction; TD = transverse direction.
[b] No roll prepared or tested due to relatively poor web strength.
[c] Relatively poor quality mat not tested; appears to result from relatively poorer dispersion.

The good strength results for the fiberglass mats are believed to result from the good fiber dispersion, good adhesion properties of the fibers and the resin/binder, or a combination thereof.

It is known that some of the materials described above may interact in a final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material that may contain the isomers, by-products, derivatives, and other such materials which are normally understood to be present in the commercial grade. However, the amount of each chemical component is presented exclusive of any solvent that may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

What is claimed is:

1. A composition comprising:
   (a) a liquid carrier;
   (b) fibers or particles dispersed or suspended therein; and
   (c) a sulfonic dispersant with a molecular weight up to about 700 suitable for wetting, dispersing or suspending said fibers in said aqueous liquid carrier; provided that when (b) is particles, then the amount of (c) is up to about 5% by weight of the composition;
   wherein component (b) comprises one or more fibers selected from the group consisting of fiberglass, microglass, carbon fibers, coated carbon fibers, polyester fibers, polyimide fibers, polyamide fibers, acrylic fiber, cellulose fibers, rayon, nylon, asbestos, and polyvinyl chloride fibers; and
   wherein the liquid carrier comprises water and at least one co-solvent.

2. The composition of claim 1 wherein the co-solvent comprises an alcohol, acetone or dimethylformamide or combination thereof.

3. The composition of claim 1 wherein the liquid carrier comprises an alcohol, acetone or dimethylformamide or combination thereof.

4. The composition of claim 1 wherein the fiber is fiberglass.

5. The composition of claim 1 wherein the particles are selected from the group consisting of glass, glass microballons, alumina, basalt, silica, carbon black, titanium dioxide, and gypsum.

6. The composition of claim 1 wherein the sulfonic dispersant comprises a hydrocarbylamido-alkanesulfonic acid or a salt thereof.

7. The composition of claim 6 wherein the sulfonic dispersant is 2 acrylamido-2-methylpropane sulfonic acid or a salt thereof.

8. The composition of claim 1, wherein the sulfonic dispersant is present in an amount of about 10-1000 ppm.

9. The composition of claim 1, further comprising an additive to modify the pH of said composition to a desired pH range.

10. The composition of claim 9, wherein the pH range is about 1-11.

11. The composition of claim 1, further comprising incorporating into the composition a thickener, a biocide, a binder or a defoamer.

12. A method for suspending or dispersing fibers or particles in an aqueous liquid carrier, comprising the step combining:
   (a) combining
      (i) an aqueous liquid carrier
      (ii) fibers or particles; and
      (iii) a sulfonic dispersant with a molecular weight up to about 700 suitable for wetting, dispersing or suspending said fibers in said aqueous liquid carrier; provided that when (a)(ii) is particles, then the amount of (a)(iii) is up to about 5% by weight of the composition; and
   (b) mixing the resulting composition;
   wherein component (b) comprises one or more fibers selected from the group consisting of fiberglass, microglass, carbon fibers, coated carbon fibers, polyester fibers, polyimide fibers, polyamide fibers, acrylic fiber, cellulose fibers, rayon, nylon, asbestos, and polyvinyl chloride fibers; and
   wherein the liquid carrier comprises water and at least one co-solvent.

13. The method of claim 12 wherein said 2-acrylamido-2-methylpropane sulfonic acid or salt thereof is present in an amount of about 25-400 ppm.

14. A method for preparing a non-woven mat of fibrous material, comprising the steps of:

(a) combining
- (i) an aqueous medium;
- (ii) fibers; and
- (iii) a sulfonic dispersant with a molecular weight up to about 700 suitable for wetting, dispersing or suspending said fibers in said aqueous medium;

(b) mixing the resulting composition;

(c) transferring said composition to a mat-forming device; and (d) removing the aqueous medium from the composition;

wherein component (a)(ii) comprises one or more fibers selected from the group consisting of fiberglass, microglass, carbon fibers, coated carbon fibers, polyester fibers, polyimide fibers, polyamide fibers, acrylic fiber, cellulose fibers, rayon, nylon, asbestos, and polyvinyl chloride fibers; and wherein the liquid carrier comprises water and at least one co-solvent.

15. The method of claim 14 further comprising incorporating into the composition a thickener, a biocide, a binder or a defoamner.

16. The method of claim 14, further comprising introducing an additive to modify the pH of the said composition to a desired pH range.

17. A method for preparing a non-woven mat of fibrous material, comprising the steps of:
(a) combining
- (i) an aqueous medium;
- (ii) fiberglass fibers and one or more optional particles; and
- (iii) a sulfonic dispersant with a molecular weight up to about 700 suitable for wetting, dispersing or suspending said fibers in said aqueous medium;

(b) mixing the resulting composition;

(c) transferring said composition to a mat-forming device; and (d) removing the aqueous medium from the composition.

* * * * *